United States Patent [19]
Lisowsky

[11] Patent Number: 5,248,130
[45] Date of Patent: Sep. 28, 1993

[54] VEHICLE LEAF SPRING WITH IRRADIATED CENTER FOR CRACK DIVERSION

[75] Inventor: Bohdan Lisowsky, Troy, Mich.

[73] Assignee: Eaton Corporation, Cleveland, Ohio

[21] Appl. No.: 666,967

[22] Filed: Mar. 11, 1991

[51] Int. Cl.$^5$ .............. B60G 11/02; F16F 1/18; C21D 1/06; B23K 15/00

[52] U.S. Cl. .............. 267/47; 267/40; 267/51; 267/158; 29/173; 219/121.16; 219/121.17; 219/121.65; 219/121.66; 148/565; 148/580

[58] Field of Search .............. 267/7, 36.1, 37.1, 40, 267/47, 51, 158; 29/173; 148/1, 4, 134; 219/121.16, 121.17, 121.65, 121.66

[56] References Cited

U.S. PATENT DOCUMENTS

| | | | |
|---|---|---|---|
| 1,638,516 | 9/1927 | Ware | 267/47 X |
| 3,705,718 | 12/1972 | Fukui et al. | 267/47 |
| 3,773,565 | 11/1973 | Pye et al. | 148/1 |
| 3,818,577 | 6/1974 | Bailey et al. | 29/888.09 X |
| 3,850,698 | 11/1974 | Mallozzi et al. | 148/1 X |
| 4,000,011 | 12/1976 | Sato et al. | 219/121.16 X |
| 4,401,477 | 8/1983 | Clauer et al. | 148/1 X |
| 4,644,126 | 2/1987 | Schumacher | 219/121 |
| 4,905,538 | 3/1990 | Watanabe et al. | 219/121.17 X |
| 4,915,746 | 4/1990 | Welsch | 148/4 |
| 4,927,121 | 5/1990 | Komarov et al. | 267/36.1 X |
| 5,080,726 | 1/1992 | McKannan et al. | 148/1 |

FOREIGN PATENT DOCUMENTS 0011740 1/1983 Japan ............. 148/134

Primary Examiner—Robert J. Oberleitner
Assistant Examiner—Josie A. Ballato
Attorney, Agent, or Firm—A. E. Chrow

[57] ABSTRACT

A vehicle suspension member such as leaf spring (50) is provided having at least one plate (3) having an irradiation exposed region (R) therein that is generally parallel to a longitudinal axis ("L/A") extending between opposite ends of plate (3) and operative to provide a metallurgical discontinuity extending therealong between opposite ends thereof that is effective to divert crack propagation in a direction generally parallel to axis ("L/A").

7 Claims, 3 Drawing Sheets

VEHICLE LEAF SPRING WITH IRRADIATED CENTER FOR CRACK DIVERSION

INTRODUCTION

This invention relates generally to a vehicle suspension member and method for making same exemplary of which a leaf spring comprising a singular or plurality of plates or leafs having a metallurgically altered region therein that is substantially parallel to a longitudinal axis extending therealong between opposite ends of the plate of leaf and operative to provide at least one discontinuity therein effective to direct or divert crack propagation in a direction generally parallel to the longitudinal axis.

BACKGROUND OF THE INVENTION

Although coil springs have recently come into favor for passenger car suspension systems, leaf springs remain in favor for use particularly in truck, suspension systems, and are likely to for many years to come because of the load capacity, packaging and axle location advantages associated therewith. Although described herein with particularity to leaf springs, the present invention includes any vehicle suspension members subject to torsional or bending loads and having a longitudinal axis extending between opposite ends such as torque rods (also called trailing arms, for axle control); traction bars (keep axle from twisting during braking); and track rods (keep axle from shifting laterally).

Leaf springs generally comprise a singular leaf or plate or a plurality of leafs or plates that may be made from constant or tapered thickness plates or leaves. most commonly made from steel and secured together and operative to support the frame of the vehicle on the wheel axle. As might be expected, the number of leafs or plates employed in the leaf spring is based on allowable design stress for a given load capacity and deflection range.

Each plate of a leaf spring is subjected to bending producing a (positive) tensile stress on the upper, typically concave, surface of the leaf to which the vehicle load or force is applied. As a result, a balancing (negative) compressive stress is developed on the lower, typically convex, surface of the leaf. The tensile stress is a maximum at the upper surface of the leaf and decreases to zero at or near the center of the plate thickness also known as the neutral axis hereinafter referred to as longitudinal axis extending between opposite ends of the leaf or plate. Similarly, the balancing compressive stress is a maximum at the lower surface declining to zero at the longitudinal axis. Virtually all cracks are initiated at or near the upper surface of the leaf spring plate at the point of maximum tensile stress.

Due to high strength requirements, leaf springs must have high hardness that is associated with rapid crack propagation through the leaf cross-section once a relatively shallow crack is developed at the tensile surface. The incidence of crack initiation and progression is generally a function of increased service life or time and also service conditions including load history and corrosion. No matter how a crack may develop, ie., fatigue and/or corrosion, its progression beyond a critical depth of generally less than on-half of section thickness is rapid to complete fracture or separation.

The present invention provides a means of detering or diverting crack propagation which initiates at or near the upper tensile surface and progresses through the thickness of the leaf or plate in a direction essentially perpendicular to the longitudinal axis of the leaf by redirecting crack progression to a direction generally parallel thereto. Effectively, the parallel crack or delamination of the flat (or tapered) plate section lowers section stiffness causing the spring to sag well before final fracture providing the user some early indication of impending spring failure prior to complete separation and possible vehicle debilitation.

SUMMARY OF THE INVENTION

Accordingly, it is an object of this invention to provide a vehicular suspension member having a longitudinal axis extending therealong between opposite ends thereof and having a metallurgical discontinuity therein effective to divert crack propagation in a direction generally parallel thereto.

It is another object of this invention to provide a method for making a vehicle suspension member having a longitudinal axis extending therealong between opposite side thereof and having a metallurgical discontinuity therein effective to divert crack propagation in a direction generally parallel thereto.

DESCRIPTION OF SOME PREFERRED EMBODIMENTS

Figure 1:
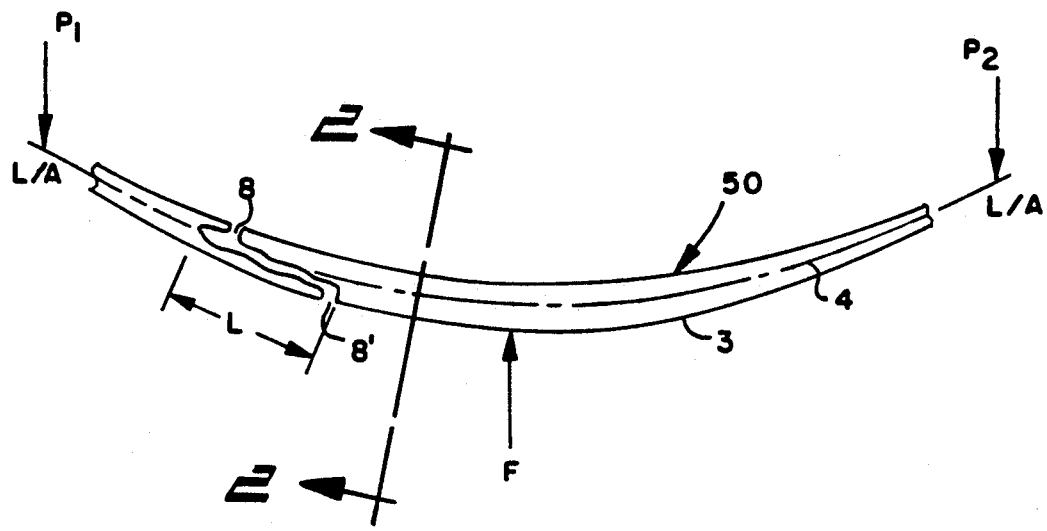
FIG. 1 is a side view of a vehicle suspension leaf spring 50 showing crack propagation.
Figure 2:
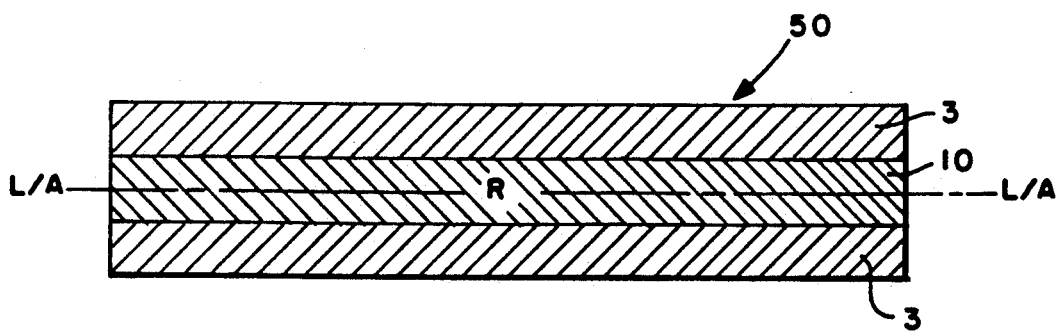
FIG. 2 is a cross section taken along view line 2—2 through leaf spring 50 of FIG. 1.

Leaf spring 50 of FIG. 1 is illustrative of the manner in which crack propagation is deterred in accordance with the invention. Spring 50 characteristically comprises at least one flat or tapered leaf or plate 3 having a substantially rectangular cross section as shown in FIG. 2 that extends between opposite ends (not shown) that are adapted such as by being formed into eyelets to secure spring leaf 50 to a vehicle frame or perhaps to another suspension system that is secured to the vehicle frame. In some instances it may be preferable to omit eyelets. Commonly only one plate in a stacked plurality of spring leaf plates need have eyelets at one or both of its opposite ends. Although shown in FIG. 1 as tapering towards it opposite ends to provide the greatest thickness at its center, plate 3 may also have a substantially constant thickness throughout its entire length as is well known to those skilled in leaf spring art.

Plate 3 has a longitudinal axis "L/A" referenced by numeral 4 that extends therealong between opposite ends thereof. Since the cross section of leaf or plate 3 is generally symmetrical, axis "L/A" will generally pass through the center thereof as shown in FIG. 1.

Generally, when plate 3 is repetitively bent, such as by repetitive bending loads "$P_1$" and "$P_2$" at the point of securement (not shown in FIG. 1), a reaction force "F" is created at the spring seat that commonly bridges across the center thereof and which has ultimately caused a crack to occur at the upper tensile surface due to fatigue as denoted by reference numeral 8. But rather than cracking completely through plate 3 the crack propagation has been directed or diverted in a direction generally parallel to axis "L/A" a distance "L" because of a metallurgical discontinuity that has been purposely introduced within plate 3 as hereinafter described.

As used herein, the word "discontinuity" means a discontinuity in mechanical properties situated along a single plane or along multiple planes that are disposed in a direction generally parallel to the longitudinal axis but not necessarily continuous therealong. In instances where the suspension member is a leaf or plate subject to bending loads, the discontinuity is preferably disposed near the neutral axis of the leaf or plate.

The metallurgical discontinuity arises from an irradiation exposed region "R" purposefully introduced therein that is generally parallel to axis "L/A".

One method by which metallurgically altered region "R" referenced by numeral 10 in FIG. 2 is created is by exposure to radiation hereinafter described with respect to FIG. 3.

Figure 3:
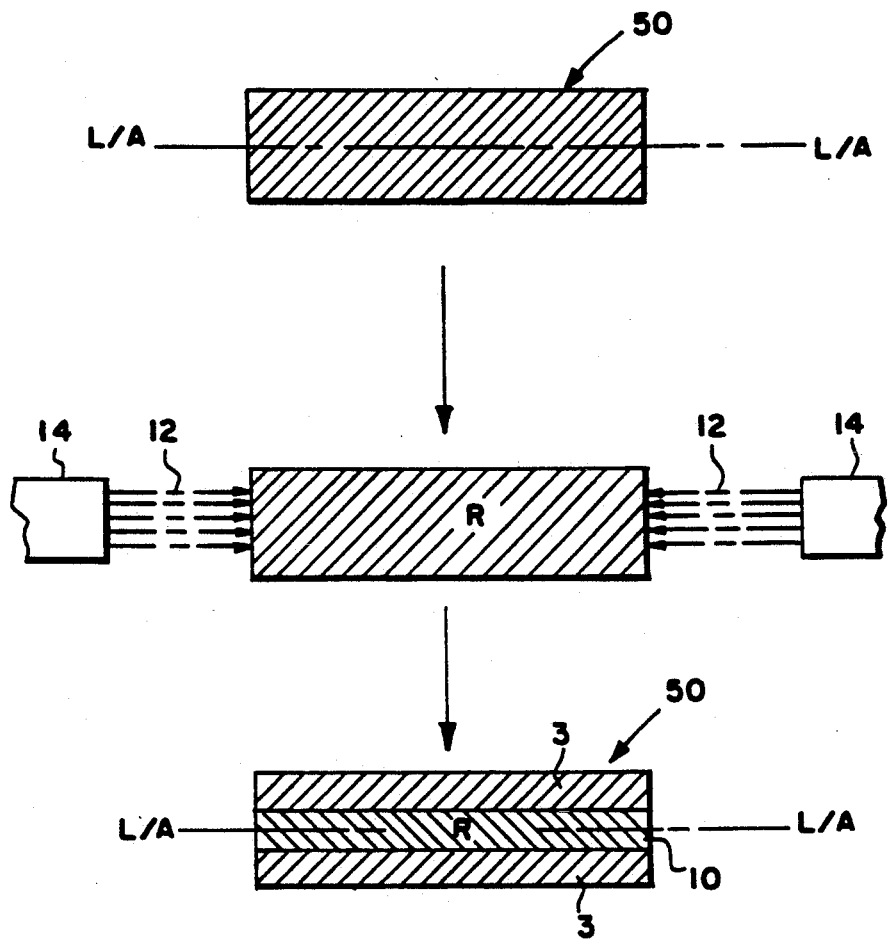
FIG. 3 is a schematic block diagram of a preferred embodiment of a method of making leaf spring 50 of FIGS. 1 and 2.

In FIG. 3, a plate 50 is provided having a substantially retangular cross section having a longitudinal axis "L/A" extending through the center since the cross section is generally symmetrical.

At least one side and preferably both sides of plate 50 are exposed to radiation 12 emitted from a radiation source 14 that directs radiation 12 preferably towards the center of the edge of plate 50 so as to create region "R" symmetrically about axis "L/A" and in generally parallel relationship thereto.

It is known that radiation of sufficient energy can impinge upon and impart energy to the metal molecules sufficient to heat the metal to an annealing temperature at which grain growth is initiated and even to a temperature sufficient to cause the metal to melt (here remelt) and then solidify upon cooling. As such, radiant energy is able to metallurgically alter the metal in region "R" since the width or breadth of the radiation beam and the focal point can be controlled with high degree of accuracy by means of masks, magnetic fields, optical and other devices well known to those skilled in the art.

Preferably, the radiation is high energy electron radiation such as described in U.S. Pat. No. 4,644,126, the disclosure of which is included herein by reference. As set forth therein, and for purposes of this invention the term "radiation" includes electron or laser beam type radiation as well as proton or helium ion beams from a duo-plasmatron all of which will melt and subsequently weld metal when focused to a high enough power density.

As an example, an electron beam having a radiance of from about $10^8$ to watt/cm$^2$ steradian or a laser beam having a radiance of about $10^6$ to $10^8$ watt/cm$^2$-steradian is quite capable of melting metal.

The radiation particle energy is able to be focused at a precise target such as the location of axis "L/A" extending along a vehicle suspension spring leaf.

The radiation beam energy imparted to plate 50 of FIG. 3 provides metallurgically altered region "R" by focused annealing and even melting which creates a difference in the grain structure operative to create the metallurgical discontinuity that is effective to divert crack propagation in a direction generally parallel to axis "L/A" as shown in FIG. 1.

Figure 4:
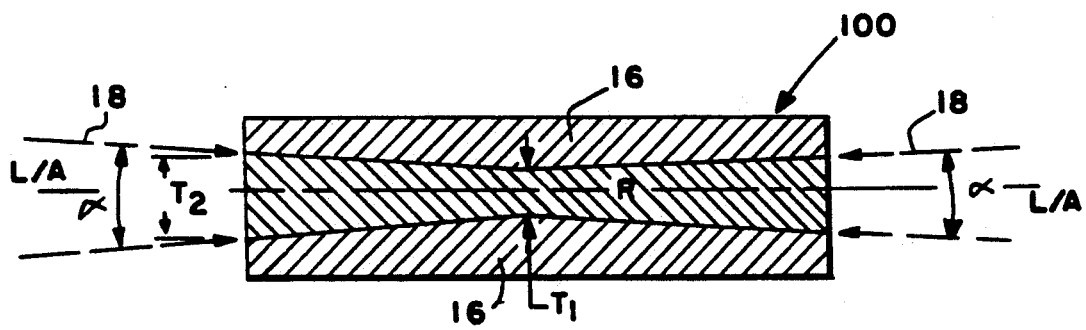
FIG. 4 is a cross section of a leaf spring 100 made in accordance with the invention.

FIG. 4 illustrates the principle that radiation heating is most effective when focused as a cone shaped radiant beam upon an object which, in the case of FIG. 4, is towards opposite edges of spring leaf 100, with radiation beam 18 having an included angle alpha ($\alpha$). As such, the thickness "$T_1$" at the center of region "R" of plate 16 is less than the thickness "$T_2$" of region "R" of plate 16 shown in FIG. 4. In such instances the taper of the cone can be controlled such that region "R" at the side or edge still remains in general parallel relationship to axis "L/A" across the breadth of spring leaf 100.

Also illustrated in FIG. 4 is the principal that the differential in thickness between "$T_2$" and "$T_1$" can be minimized by exposing opposite sides or edges of plate 16 to radiation such that the focal point of each beam extends past the center of plate 16 such that the radiation beams 18 overlap at the center of plate 16 as shown in FIG. 4.

Preferably, the average thickness of region "R" for a spring leaf having a thickness of about 0.250 inch is from about 0.050 to about 0.080 inch or generally from about ¼ to about ⅓ the total thickness of the spring leaf plate.

Figure 5:
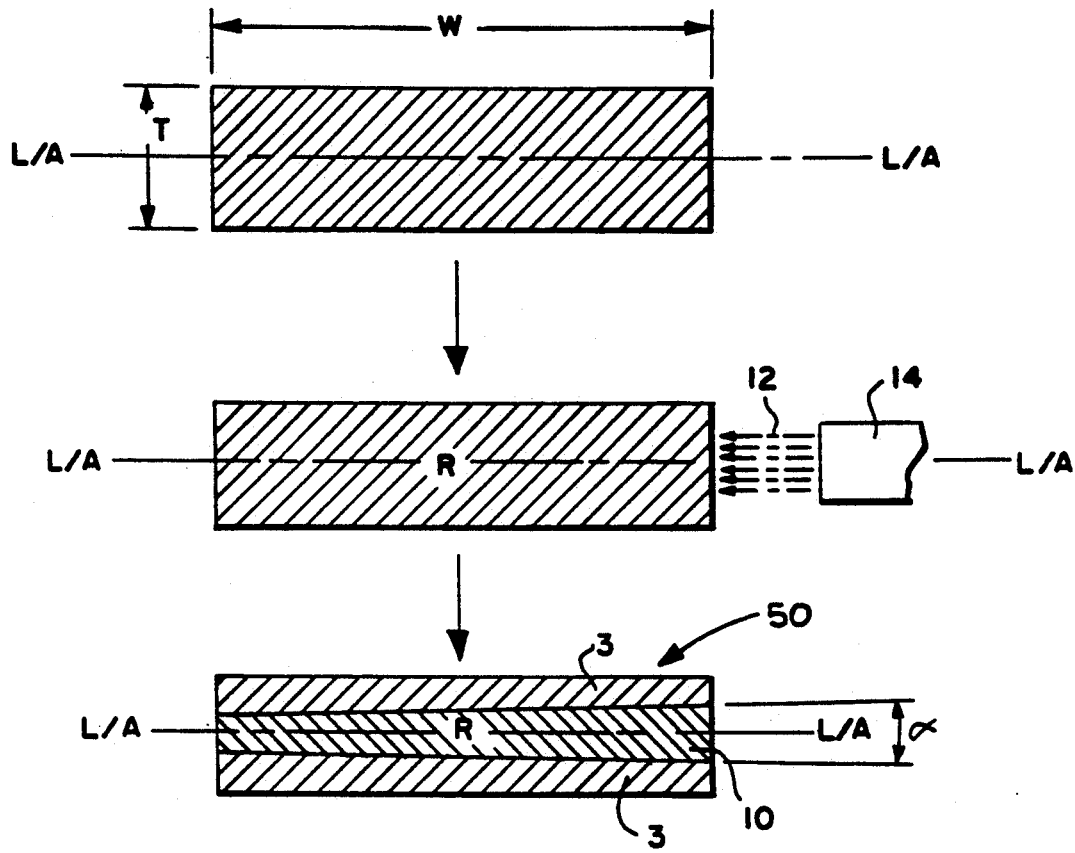
FIG. 5 is a schematic block diagram of a variation on the embodiment of the method shown in FIG. 3.
Figure 6:
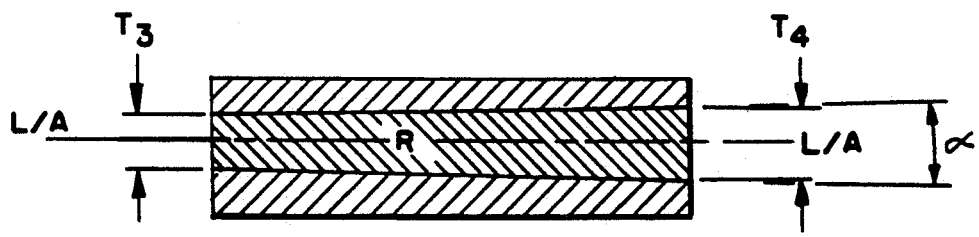
FIG. 6 is a cross-section of a leaf spring 100 made in accordance with the method of FIG. 5.

FIG. 5 shows a variation of the method of FIG. 3 where only one edge of the spring leaf plate is exposed to radiation only from one side to provide a tapered region "R" referenced by numeral 10 having an included angle. This is most advantageous for thick and narrow width plate sections thus offering attractive economics. In such cases the angle alpha ($\alpha$) of the beam created the acceptable "$T_3$" and "$T_4$" affected region thickness for the needed fatigue life as shown in FIG. 6.

It is desired to control the thickness of the affected region "R" as small as possible so as to generate an abrupt metallurgically altered region to enchance crack retardation and deflection. Hence, for thick sections, as in the order of 0.500 inch or greater, it is desirous to maintain the "$T_3$" and "$T_4$" to about 0.050 to about 0.080 inch. However, greater thicknesses are permitted as stated above from about ¼ to about ⅓ the total thickness of the spring leaf plate.

The methods of FIGS. 3 and 5 apply to both constant thickness plates and to plates or leaves having a tapered thickness along their lengths as would commonly be used for single leaf suspension once appropriate tooling and/or computer control is implemented to guide the energy beam along the longitudinal axis.

What is claimed is:

1. A vehicle suspension member comprising a metal member having a longitudinal axis extending between opposite ends therealong, said member having an irradiation exposed region therein that is disposed in general parallel relationship to the longitudinal axis and operative to provide a metallurgical discontinuity therein effective to divert crack propagation in a direction generally parallel to the longitudinal axis.

2. The suspension member of claim 1 wherein the irradiation exposed region is a high energy electron beam irradiation exposed region.

3. The suspension member of claim 1 wherein the metallurgical discontinuity is a solidified remelt discontinuity.

4. The suspension member of claim 1 wherein the metallurgical discontinuity is a solidified high energy electron beam irradiation remelt discontinuity.

5. The suspension member of claim 1 in the form of a leaf spring having at least one plate having the longitudinal axis extending between opposite ends therealong and having the metallurgical discontinuity disposed therein in general parallel relationship to the longitudinal axis.

6. The leaf spring of claim 5 wherein the plate tapers so as to diminish in thickness in a direction towards its opposite ends from a thickest section bridging the middle thereof.

7. The suspension member of claim 1 wherein the irradiation exposed region is a high energy laser beam irradiation exposed region.

* * * * *